United States Patent [19]

Seragnoli

[11] Patent Number: 4,645,063
[45] Date of Patent: Feb. 24, 1987

[54] CIGARETTE TRANSFER DEVICE

[75] Inventor: Enzo Seragnoli, Bologna, Italy

[73] Assignee: G.D Societa per Azioni, Bologna, Italy

[21] Appl. No.: 745,813

[22] Filed: Jun. 17, 1985

Related U.S. Application Data

[63] Continuation of Ser. No. 439,383, Nov. 5, 1982, abandoned.

[30] Foreign Application Priority Data

Nov. 24, 1981 [IT] Italy ............................... 49764 A/81

[51] Int. Cl.⁴ ........................ B65G 29/00; B65G 47/86
[52] U.S. Cl. .................................. 198/450; 198/471.1; 198/475.1
[58] Field of Search ............... 198/471.1, 478.1, 689.1, 198/450, 441, 951, 377, 457, 475.1

[56] References Cited

U.S. PATENT DOCUMENTS

| | | | |
|---|---|---|---|
| 2,915,201 | 12/1959 | Calehuff et al. | 198/477 |
| 3,026,989 | 3/1962 | Schaltegger | 198/471.1 |
| 3,302,803 | 2/1967 | Mooney | 198/478 |
| 3,303,926 | 2/1967 | Pohl | 198/478 |
| 3,567,011 | 10/1968 | Pinkham | 198/478 |
| 3,567,043 | 3/1971 | Sirvet et al. | 198/477 |
| 3,868,009 | 2/1975 | Billi et al. | 198/477 |
| 3,952,865 | 4/1976 | Rudszinat et al. | 198/441 |
| 4,051,947 | 10/1977 | Schumacher et al. | 198/689 |
| 4,066,162 | 1/1978 | Miaskoff | 198/475.1 |
| 4,150,520 | 4/1979 | Palmieri et al. | 198/450 |
| 4,406,197 | 9/1983 | Barbenhagen et al. | 198/478 |
| 4,408,621 | 10/1983 | Schumacher | 198/478 |
| 4,574,818 | 3/1986 | Pagnoni | 198/475.1 |

FOREIGN PATENT DOCUMENTS

| | | |
|---|---|---|
| 48620 | 12/1982 | Italy . |
| 875797 | 8/1961 | United Kingdom . |
| 1007515 | 10/1965 | United Kingdom . |
| 1264622 | 2/1972 | United Kingdom . |
| 2099780 | 5/1982 | United Kingdom ................ 198/478 |

Primary Examiner—Joseph E. Valenza
Assistant Examiner—Daniel R. Alexander
Attorney, Agent, or Firm—Marshall, O'Toole, Gerstein, Murray & Bicknell

[57] ABSTRACT

A device for transferring cigarette pieces from a twin rod cigarette-making machine to a filter fitting machine, in which the cigarette pieces are transferred two at a time, one for each of the two rods from a horizontal output bed of the cigarette-making machine to the top of an input drum of the filter fitting machine the axis of which is parallel to the rods, by a plurality of take-up heads which move about an axis perpendicular to the plane of the rods, maintaining themselves parallel thereto and moving with a speed which is variable between a maximum at take-up from the bed and a minimum at release on the summit of the input drum.

5 Claims, 2 Drawing Figures

CIGARETTE TRANSFER DEVICE

This application is a continuation, of application Ser. No. 439,383, filed Nov. 5, 1982, now abandoned.

BACKGROUND OF THE INVENTION

The present invention relates to a device for transferring cigarettes from a twin rod cigarette-making machine to a filter fixing machine.

In twin rod cigarette-making machines, the two cigarette rods, once formed, are advanced parallel to one another along a normally horizontal, output bed. During their advance along the said bed the rods traverse a cutting station in which they are cut transversely into pieces of equal length which continue to advance in the same direction along the bed.

When filter cigarettes are made, the said pieces must be transferred from the said bed of the cigarette-making machine to a filter fitting machine the input station of which is normally constituted by a drum conveyor disposed with its axis in a position parallel to the rods and having axial external grooves which can each receive at least one cigarette. The above mentioned transfer operation could be easily performed by utilising known transfer devices which are normally used on single rod cigarette making machines, with each said device cooperating with a respective rod of the twin rod machine. However, such a solution would obviously involve the construction of relatively complex mechanical structures the use of which would result in high costs and low reliability.

SUMMARY OF THE INVENTION

The present invention proposes the construction of a device which permits cigarette pieces to be transferred from a twin rod cigarette-making machine to a filter fitting machine by taking the cigarette pieces simultaneously from a take-up position with a single mechanism and transferring them into adjacent grooves of the input drum of the filter fitting machine.

According to the present invention there is provided a device for transferring cigarette pieces from a twin rod cigarette-making machine to a filter fitting machine, the device being characterised by the fact that it comprises, in combination, at least one head for transferring at least a pair of the said cigarette pieces from a take-up position at the end of an output bed of the cigarette making machine to a release position above the top of an input drum of the said filter fitting machine disposed with its axis of rotation parallel to the said rods; transfer means for translating each said head along a trajectory passing through the said two positions, and level varying means operable to impart to each said head movements in a direction perpendicular to a plane defined by the said rods; the said trajectory being substantially parallel to a direction of advance of the said rods along the said bed at the said take-up position, and being substantially perpendicular to the said direction of advance in the said release position.

BRIEF DESCRIPTION OF THE DRAWINGS

Further characteristics and advantages of the present invention will become apparent from the following description with reference to the attached drawings, which illustrate a non limiting embodiment, in which.

DETAILED DESCRIPTION OF THE INVENTION

Figure 1:
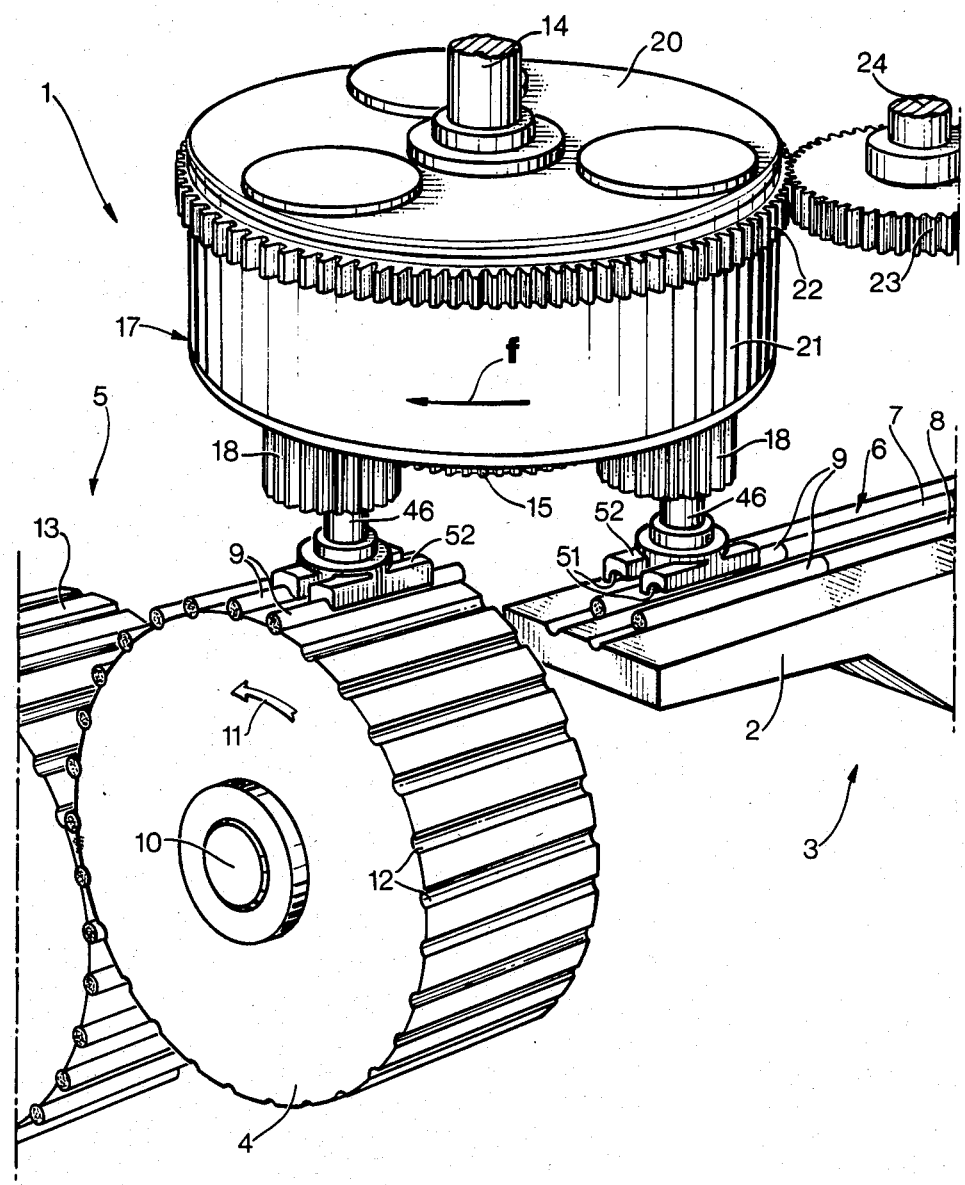
FIG. 1 is a schematic perspective view of a cigarette transfer device formed according to the principles of the present invention and located between the output of a twin rod cigarette-making machine and the input of a filter fitting machine.

In FIG. 1 there is illustrated a transferring device indicated generally with the reference numeral 1 and interposed between the output end of a bed 2 of a twin rod cigarette-making machine 3 and an input conveyor drum 4 of a filter fitting machine 5.

The bed 2 has a flat, substantially horizontal upper surface 6 provided with two grooves parallel to one another and serving as sliding channels for associated rods 7 and 8 which have been previously separated into cigarette pieces 9 by means of a cutting device not illustrated. The drum 4, rotatably mounted on a substantially horizontal shaft 10 the axis of which lies parallel to the rods 7 and 8, is positioned with its upper generatrix disposed at a level substantially corresponding to that of the upper surface 6 of the bed 2.

In the example of FIG. 1 the drum 4 is able to rotate about its axis in an counter-clockwise direction as indicated by an arrow 11 and it has a plurality of external axial grooves 12 uniformly distributed around the periphery and each is operable to receive and retain an associated cigarette piece 9 and to transfer it to an externally grooved conveyor drum 13 of the filter fitting machine 5.

Figure 2:
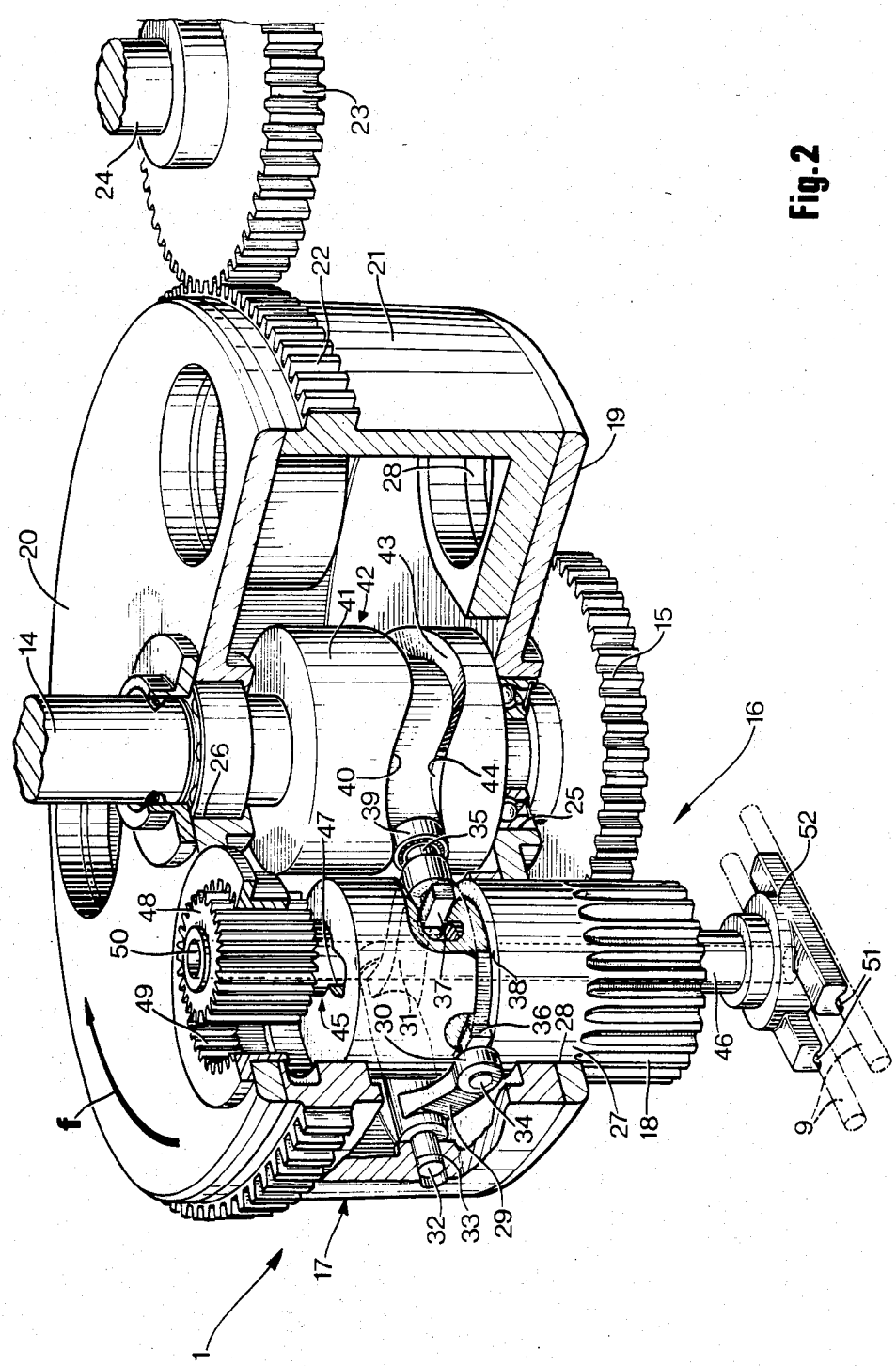
FIG. 2 is a schematic perspective view, with parts in section and parts removed for clarity, of the transfer device of FIG. 1.

As illustrated, in particular in FIG. 2, the conveyor device 1 includes a central shaft 14 connected in a fixed position to a support, not illustrated, and located substantially vertically with its free end extending downwardly. On shaft 14 there is keyed a fixed sun wheel 15 of an epicyclic gear mechanism generally indicated as 16 and including, as well as the sun wheel 15, a planet carrier or spider 17 and a plurality of planet gears 18 coupled to the sun wheel 15 and rotatably supported by the planet carrier 17.

In the example illustrated in FIG. 2, the planet carrier 17 comprises a cylindrical casing coaxial with the shaft 14 and including a lower flat wall 19, an upper flat wall 20 and a cylindrical side wall 21 having external teeth 22 coupled with a toothed gear 23 keyed onto a drive shaft 24. The lower wall 19 has a central axial hole 25 the inner surface of which is rotatably coupled to a section of the outer surface of the shaft 14 disposed above the sun wheel 15, which is disposed outside and beneath the said casing of the planet carrier 17. Similarly, the upper wall 20 also has a central through hole 26 coaxial with the hole 25 and rotatably engaged with the shaft 14.

Each planet gear 18 is formed on the lower end of a cylindrical body 27 which rotatably contacts the inner surface of hole 28 formed in the wall 19 parallel to the hole 25, and the body 27 is axially supported on the planet carrier 17 by the interposition of an associated fork 29. The fork 29 includes two arms 30 and 31 substantially parallel to one another and extending from the opposite ends of a central pin 32. Pin 32 is located in a substantially radial position within the casing of the planet carrier 17 and rotatably engages a through hole 33 formed in the wall 21. The arms 30 and 31 rotatably support at their free ends respective pins 34 and 35 which are coaxial with one another and disposed radially with respect to the wall 21. The pins 34,35 carry at their opposing ends respective shoes 36 and 37 slidably engaged in an annular groove 38 formed on the outer surface of the associated cylindrical body 27 above the related planet gear 18. On a second end, facing the surface of the shaft 14, the pin 35 carries cam follower means comprising a roller 39 which rolls in an annular groove 40 formed on the outer surface of an enlarged central section 41 of the shaft 14 defining, together with the groove 40, a drum cam 42 within the interior of the casing of the planet carrier 17.

The annular groove 40 has along its path a lower section 43 followed by a higher section 44. The sections 43 and 44, when traversed by the roller 39, cause, upon rotation of the planet carrier 17 in the direction of the arrow f, in the first place a progressive downward rotation and then a progressive upward rotation of the fork 29 about the axis of the pin 32. Each cylindrical body 27 functions as the crank of a crank device generally indicated 45, the crank pin of which is a shaft 46, having an axis parallel to that of the shaft 14, mounted rotatably within a hole 47 formed through the cylindrical body 27 parallel to the axis thereof but in an eccentric position.

On the upper end of the shaft 46 there is keyed a pinion gear 48 which meshes with the inner teeth of an associated ring gear 49 mounted in the wall 20 in a position coaxial to the associated cylindrical body 27 and rigidly connected to the planet carrier 17. Each shaft 46 is traversed axially by a duct 50 the upper end of which communicates, over part of the rotation of the planet carrier 17 about the axis of the shaft 14, with a suction device, not illustrated, and the lower end of which communicates with the bottom of two grooves 51, formed on a flat lower surface of a plate or take-up head 52 rigidly connected to the lower end of the shaft 46 extending below the cylindrical casing of the planet carrier 17.

The said lower surface of the head 52 is substantially perpendicular to the axis of the shaft 14, and the grooves 51 formed thereon are parallel to one another, are similar to the grooves 12, and are located at a distance from one another equal to the distance between the rods 7 and 8 and between two adjacent grooves 12.

In the conveyor device 1, described by way of example, the transmission ratio between the sun wheel 15 and each planet gear 18 is equal to two, and the transmission ratio between the ring gear 49 and the associated pinion 48 is equal to three/two. As a result of this transmission ratio, each take-up head 52 is displaced about the axis of the shaft 14 in such a way that it maintains itself parallel to itself, that is to say without variation in the orientation of its grooves 51 which are suitably disposed, upon assembly, parallel to the rods 7 and 8. As far as the speed of displacement of each head 52 about the axis of the shaft 14 is concerned, this velocity varies in dependence on the position of the associated pinion 48 with respect to the shaft 14. In particular, the speed of each head 52 varies proportionally with the distance of the associated pinion 48 from the axis of the shaft 14. In the illustrated example, since the transmission ratio between the gears 15 and 18 is equal to 2, upon each revolution of the planet carrier 17 about the shaft 14 each pinion 48 traverses the associated ring gear 49 twice, so that a variation of the velocity of each head 52 between a minimum value and a maximum value corresponds to a rotation of substantially 90° of the planet carrier 17 about the shaft 14.

In use, the device 1 is mounted above the bed 2 and the drum 4 in such a way that the path followed by the heads 52 takes them past a take-up position above the end of the bed 2 and a release position over the top of the drum 4. In the apparatus illustrated by the drawings, the path from the first to the second of the said two positions corresponds to a rotation of about 90° of the planet carrier 17 about the shaft 14. During its rotation about the shaft 14, each head 52 is subjected to a vertical displacement controlled by the cam 42. In particular, when a head 52 is just about to reach the said take-up position, the associated roller 39 engages the lower section 43 of the groove 40 causing the descent of the head 52 over the bed 2 until it receives two cigarette pieces 9 within its grooves 51 and retains these by suction.

Subsequently, following continued rolling of the associated roller 39 in contact with the groove 38 of the cam 42, each head 52 rises and then lowers again to deposit the two cigarette pieces 9 onto the top of the drum 4. Since the distance between two successive cigarette pieces 9 along the bed 2 is substantially equal to the length thereof, whilst the distance between adjacent cigarette pieces 9 on the drum 4 is equal to the distance between the rods 7 and 8, the ratio between the speed of take-up and that of release will be equal to the ratio between the length of the cigarette pieces 9 and twice the distance between the rods 7 and 8 and, moreover, the speed of take-up will be equal to the speed of advance of the cigarette pieces 7 and 8 along the bed 2.

By suitably dimensioning the epicyclic gear mechanism 16 and the gears 48-49, the maximum speed of the head can coincide with the passage of the head 52 across the take-up position, and the minimum speed of the head can coincide with the passage of the head 52 across the release position, and at the same time to equalise the ratio between the said maximum and minimum values with the ratio between the length of the cigarette pieces 9 and twice the distance between the cigarette rods 7 and 8.

It is claimed:

1. Apparatus for transferring at least a pair of cigarette rods from a take-up position at the end of an output bed (2) of a cigarette-making machine to a release position above the top of an input drum (4) of a filter fitting machine (5) comprising:
   a cylindrical casing (19,20,21) mounted on a fixed central shaft (14) to rotate freely relative to the shaft;
   means (22,23) to rotate the casing;
   cigarette transfer means (16,45) comprising a cylindrical body (27) rotatably mounted in a circular hole in the casing, a head shaft extending through the cylindrical body parallel to but off set from the axis of the cylindrical body, and a head on the lower end of the head shaft for releasably receiving at least a pair of cigarette rods, and means to rotate the head shaft in the cylindrical body, when the casing rotates, to thereby turn and translate the head along a transfer path passing through the take-up position to the release position;
   head level variation means (42) comprising means to axially displace the cylindrical body together with the head shaft as the head shaft rotates therein to impart movement to the head in a direction perpendicular to a plane (6) defined by the cigarette rods (7 or 8) as the head moves along the transfer path from the take-up position to the release position;

the transfer means and the level variation means being independently operable of each other; and the transfer path being substantially parallel to a direction of advance of the said rods along the bed (2) at the take-up position, and being substantially perpendicular to the said direction of advance in the said release position.

2. Apparatus according to claim 1 in which the transfer means (16, 45) includes an epicyclic gear mechanism having a sun gear (15) fixed on the central shaft (14); a planet gear (18), on the cylindrical body, which engages the fixed sun gear so that the cylindrical body rotates when the casing rotates; and, the head shaft has a pinion gear at the other end which meshes with the internal teeth of a ring gear (49) carried by the casing.

3. Apparatus according to claim 2 in which the level variation means includes a fixed drum cam (42) mounted on the central shaft and coaxial to the sun gear (15), and cam follower means (39) coupled to the cylindrical body for transmitting axial movements to the cylindrical body and the head shaft relative to the casing.

4. Apparatus for transferring at least a pair of cigarette rods from a take-up position at the end of an output bed (2) of a cigarette-making machine to a release position above the top of an input drum (4) of a filter fitting machine (5) comprising:

a cylindrical casing (19,20,21) mounted on a fixed central shaft (14) to rotate freely relative to the shaft;

means (22,23) to rotate the casing;

cigarette transfer means (16,45) comprising a cylindrical body (27) rotatably mounted in a circular hole in the casing, a head shaft extending through the cylindrical body parallel to but off set from the axis of the cylindrical body, and a head on the lower end of the head shaft for releasably receiving at least a pair of cigarette rods, and means to rotate the head shaft, when the casing rotates, to thereby turn and translate the head along a transfer path passing through the take-up position to the release position;

the transfer means (16,45) including an epicyclic gear mechanism having a sun gear (15) fixed on the central shaft (14), a planet gear (18), on the cylindrical body, which engages the fixed sun gear so that the cylindrical body rotates when the casing rotates, and the head shaft having a pinion gear at the other end from the head which meshes with the internal teeth of a ring gear (49) carried by the casing;

head level variation means (42) comprising means to axially displace the head shaft and the cylindrical body as they rotate to impart movement to the head in a direction perpendicular to a plane (6) defined by the cigarette rods (7 or 8) as the head moves along the transfer path from the take-up position to the release position;

the transfer means and the level variation means being independently operable to each other; and the transfer path being substantially parallel to a direction of advance of the said rods along the bed (2) at the take-up position, and being substantially perpendicular to the said direction of advance in the said release position.

5. Apparatus for transferring at least a pair of cigarette rods from a take-up position at the end of an output bed (2) of a cigarette-making machine to a release position above the top of an input drum (4) of a filter fitting machine (5) comprising:

a cylindrical casing (19,20,21) mounted on a fixed central shaft (14) to rotate freely relative to the shaft;

means (22,23) to rotate the casing;

cigarette transfer means (16,45) comprising a cylindrical body (27) rotatably mounted in a circular hole in the casing, a head shaft extending through the cylindrical body parallel to but off set from the axis of the cylindrical body, and a head on the lower end of the head shaft for releasably receiving at least a pair of cigarette rods, and means to rotate the head shaft, when the casing rotates, to thereby turn and translate the head along a transfer path passing through the take-up position to the release position;

the transfer means (16,45) including an epicyclic gear mechanism having a sun gear (15) fixed on the central shaft (14), a planet gear (18), on the cylindrical body, which engages the fixed sun gear so that the cylindrical body rotates when the casing rotates, and the head shaft having a pinion gear at the other end from the head which meshes with the internal teeth of a ring gear (49) carried by the casing;

head level variation means (42) comprising means to axially displace the head shaft and the cylindrical body as they rotate to impart movement to the head in a direction perpendicular to a plane (6) defined by the cigarette rods (7 or 8) at the head moves along the transfer path from the take-up position to the release position;

the head level variation means including a fixed drum cam (42) mounted on the central shaft and coaxial to the sun gear (15), and cam follower means (39) coupled to the cylindrical body for transmitting axial movements to the cylindrical body and the head shaft relative to the casing;

the transfer means and the level variation means being independently operable to each other; and the transfer path being substantially parallel to a direction of advance of the said rods along the bed (2) at the take-up position, and being substantially perpendicular to the said direction of advance in the said release position.

* * * * *